US010838782B2

(12) United States Patent
Liongosari

(10) Patent No.: US 10,838,782 B2
(45) Date of Patent: Nov. 17, 2020

(54) EVENT ABSTRACTOR

(71) Applicant: Accenture Global Solutions Limited, Dublin (IE)

(72) Inventor: Edy S. Liongosari, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 999 days.

(21) Appl. No.: 15/163,181

(22) Filed: May 24, 2016

(65) Prior Publication Data

US 2017/0344404 A1 Nov. 30, 2017

(51) Int. Cl.
*G06F 9/54* (2006.01)

(52) U.S. Cl.
CPC .................... *G06F 9/542* (2013.01)

(58) Field of Classification Search
CPC ............... G05B 23/0229; G06F 9/5033; G06F 16/24568; G06F 9/542
See application file for complete search history.

(56) References Cited

U.S. PATENT DOCUMENTS

| 9,934,279 B2 * | 4/2018 | Kali ................... G06F 16/24568 |
| 2012/0320070 A1 * | 12/2012 | Arvo ..................... G06F 9/5033 345/522 |
| 2016/0239755 A1 * | 8/2016 | Aggour .............. G05B 23/0229 |

OTHER PUBLICATIONS

Li Wei "Localization of the Offshore Pollutant Source in Lakes Using Spatial-temporal Filtering" (Year: 2014).*

* cited by examiner

*Primary Examiner* — Regis J Betsch
*Assistant Examiner* — Kaleria Knox
(74) *Attorney, Agent, or Firm* — Fish & Richardson P.C.

(57) ABSTRACT

Methods, systems, and apparatus, including computer programs encoded on computer storage media, for detecting higher level events based on lower level events. In one aspect, a method includes receiving a stream model that defines elements of a data domain. A stream mapping that defines sensor identifiers for real-world sensors and associates each sensor identifier with a respective element of the data domain is received. A user-specified stream matching pattern is received. The stream matching pattern specifies respective sensor identifiers of sensor identifiers of the real-world sensors, and for each sensor identifier, a tuple of data elements of the stream model and, for each tuple of data elements, co-occurrence criteria including at least one time window. A stream of events is obtained from the real-world sensors. A determination is made that two or more events co-occur within the time window and whether the one or more co-occurrence criteria are satisfied.

20 Claims, 3 Drawing Sheets

EVENT ABSTRACTOR

BACKGROUND

This specification relates to event detection.

Data can be received from data sources in individual data streams. For example, a temperature sensor may detect the temperature in a particular area and provide to a different device a continuous stream of temperature values detected by the sensor. In another example, a sensor may store a set of values detected by the sensor and periodically provide to another device the set of values. The other device can then store the received data or perform some operation based on the data. For example, an air conditioning system may be activated or deactivated based on received temperature values.

SUMMARY

This specification describes, among other things, a system that detects higher level events based on lower level events identified in data received from data sources.

In general, one innovative aspect of the subject matter described in this specification can be embodied in methods that include the actions of receiving a stream model that defines elements of a data domain; receiving a stream mapping that defines a sensor identifier for each sensor of real-world sensors and associates each sensor identifier with a respective element of the elements of the data domain, where each of the real-world sensors generates a respective stream of real-time data elements received by a stream processing system; receiving a user-specified stream matching pattern, where the stream matching pattern specifies respective sensor identifiers of two or more sensor identifiers of the real-world sensors, and for each sensor identifier, a tuple of data elements of the stream model and, for each tuple of data elements, one or more co-occurrence criteria, where the co-occurrence criteria includes at least one time window; obtaining a stream of events from the real-world sensors; determining that two or more events co-occur within the time window specified by the stream matching pattern; determining whether the one or more co-occurrence criteria of the stream matching pattern are satisfied; and whenever the one or more co-occurrence criteria are satisfied, generating an output data element of an output data stream. Other embodiments of this aspect include corresponding systems, apparatus, and computer programs, configured to perform the actions of the methods, encoded on computer storage devices. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Some aspects include generating, by a pattern compiler, transformations of a stream processing platform.

In some aspects, the output data element specifies an occurrence of a given event based on the determination that the one or more co-occurrence criteria of the stream matching pattern are satisfied. Some aspects include determining a probability that the given event occurred and including, in the output data element, data specifying the probability.

In some aspects, determining whether the one or more co-occurrence criteria of the stream matching pattern are satisfied includes: detecting, based on a first stream of events received from a first real-world sensor, an occurrence of a first constituent event defined by the user-specified stream matching pattern within the time window; detecting, based on a second stream of events received from a second real-world sensor different from the first real-world sensor, an occurrence of a second constituent event defined by the user-specified stream matching pattern within the time window; and determining that the one or more co-occurrence criteria of the stream matching pattern are satisfied based at least on the first constituent event and the second constituent event occurring within the time window.

In some implementations, the stream matching pattern specifies a threshold value for the first constituent event and the first constituent event is detected in response to detecting one or more events in the first stream of events that satisfies the threshold value. In some aspects, the stream matching pattern specifies a threshold amount of time for the first constituent event and the first constituent event is detected in response to detecting one or more events in the first stream of events that satisfies the threshold value for at least the threshold amount of time.

Particular embodiments of the subject matter described in this specification can be implemented so as to realize one or more of the following advantages. Events can be detected quickly and without the need to evaluate large amounts of data by identifying particular data in one or more data streams, adding the identified data to an output data stream, and evaluating the data included in the output stream. Known patterns of co-occurring events can be used to detect higher level events defined by lower level events included in input data streams resulting in quicker event detection at the time the data is received.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
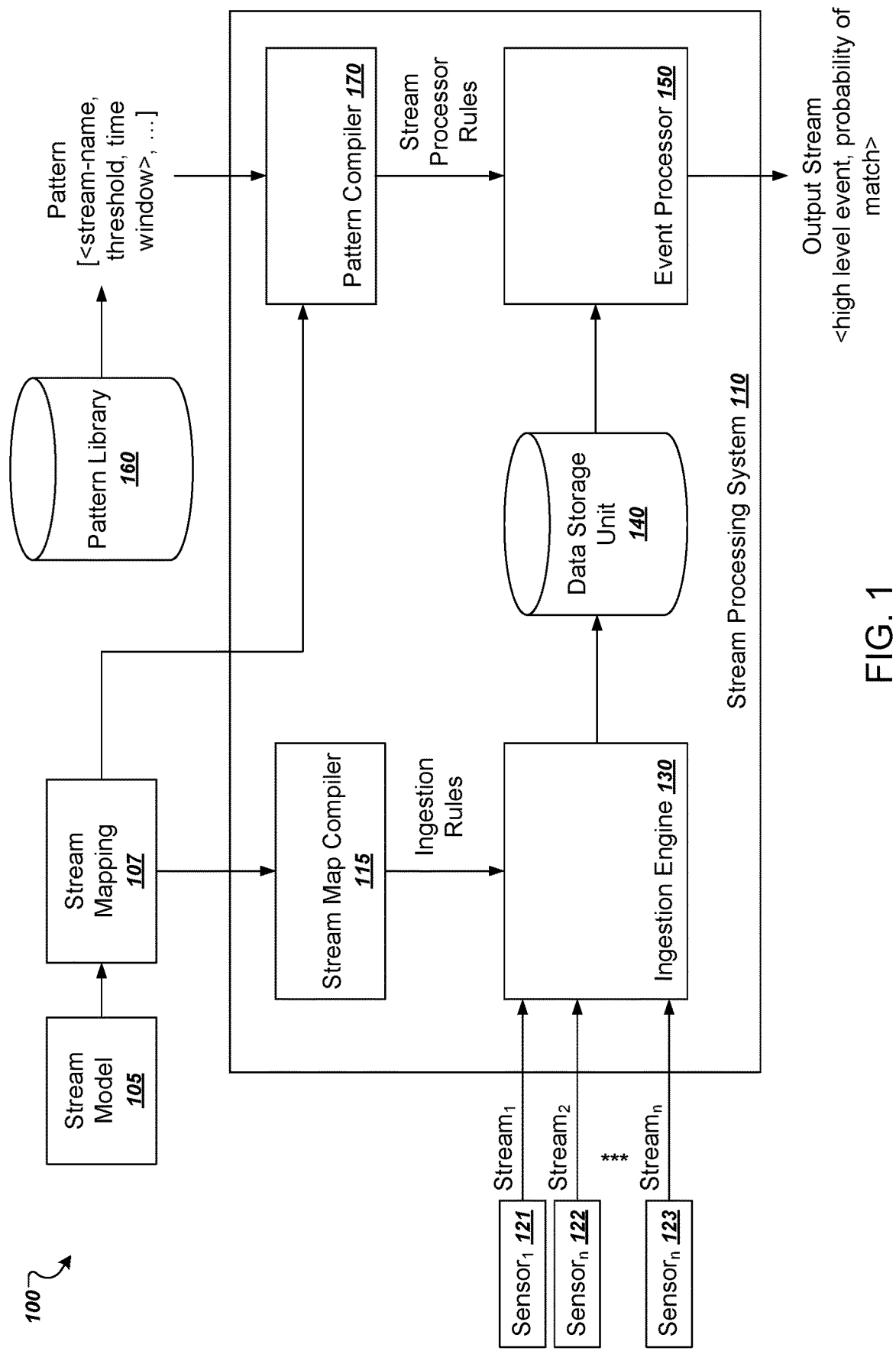
FIG. 1 is a diagram of an example environment in which a stream processing system processes data streams.

This specification describes how users can specify detection criteria for a stream processing system to detect occurrences of high-level events based on lower-level data received from one or more data sources. For example, a user can specify data that defines how and when a high-level event should be detected based on data of low-level events received from one or more data sources. For the purposes of this specification, a low-level event is a discrete event or measurement detected by a single data source. A high-level event is an event that is based on two or more co-occurring events, e.g., co-occurring low-level events and/or constituent events that are based on low-level events. Two events are considered to be co-occurring if the two events both occur within a specified amount of time.

The data sources can include sensors, e.g., real world sensors, that detect events, makes measurements, or provide other appropriate data related to events. For example, the data sources for a car may include an accelerometer, a speedometer, a brake pedal position sensor, and/or a wheel rotation sensor.

The data sources can provide data specifying events in the form of data streams or in the form of sets of data elements. A data stream is an ordered sequence of events or data elements that specify the events. Each data element can include data describing a low-level event, e.g., a measurement or detected event. An example data element is a temperature value. In some implementations, the data of a data stream or data set may include data element pairs. For example, a data element pair may include, for a particular measurement or detected event, the measurement or detected event and a time at which the measurement was made or the event was detected.

An output data stream can be generated using high-level events detected in input data streams received from the data sources. The output data stream can include data elements that specify high-level events detected from low-level events of the input data streams. For example, two events that occur within a particular amount of time and that are deemed to be related may be indicative of a high-level event. In a particular example, a vehicle brake failure may be identified if a data element of first data stream from a brake position sensor indicates that the brakes were applied at a particular time, but a tuple of data elements from a second data stream from the vehicle's speedometer indicates that the speed of the vehicle did not decrease at least a threshold amount within a particular time window after the brakes were applied. In some implementations, multiple output data streams can be generated in parallel based on respective high-level events detected for each output data stream.

A user can use more easily and more quickly evaluate high-level events included in the output data stream(s). For example, a user can use the brake failure example to determine fault in an accident that occurred after the brake failure by reviewing the output data stream and without having to correlate measurements and low-level events included in multiple different input data streams that may each include a substantial amount of data. The high-level events can be detected on the front end when the data is received without having to query large data logs, resulting in quicker event detection and a reduction in computing resources required to process the data.

FIG. 1 is a diagram of an example environment 100 in which a stream processing system 110 processes data streams. The example environment 100 also includes a stream model 105 and a stream mapping 107. The stream model 105 defines elements of a data domain. The data domain includes each type of data available for use in detecting high-level events. As described above, a high-level event is an event that is based on two or more co-occurring lower level events, e.g., low-level events or constituent events based on low-level events. For example, a high-level event may be a "braking in slippery conditions event" based on low-level events of "braking," "moisture detection," and "lack of decrease in speed." In this example, the data domain may include data generated by sensors of a vehicle, e.g., acceleration values provided by an accelerometer, speed values provided by a speedometer, location data provided by a Global Positioning System (GPS), brake position or level provided by a brake sensor, wheel rotation or position provided by a rotation or position sensor for the vehicle's wheel(s), and so on. Another example data domain may include data generated by sensors of an oil pipeline. The stream model 105 for a data domain can define, as elements of the data domain, each type of data available in the data domain.

The stream mapping 107 defines a sensor identifier for each sensor that provides data of the data domain. For example, the stream mapping 107 may define a sensor identifier for each of sensors 121-123, which provide respective data streams to an ingestion engine 130 of the stream processing system 110. In some implementations, each sensor 121-123 provides a real-time, or near real-time, stream of data elements to the ingestion engine 130.

The stream mapping 107 also associates each sensor identifier with a respective element of the data domain. For example, the stream mapping 107 may associate a speedometer (e.g., sensor 121) with speed values received in a data stream received from the speedometer. The stream mapping 107 may also associate a sensor identifier with another element of the data domain different from the element generated by the sensor identified by the respective sensor identifier. For example, the speedometer may also be associated with location data provided by a GPS device. In this way, the location data can be included with data elements that specify the speed of a vehicle at a particular time.

The stream processing system 110 includes a stream map compiler 115 that generates ingestion rules for the ingestion engine 130. The ingestion engine 130 obtains, processes, and stores data received in data streams from the sensors 121-123 based on the ingestion rules. An ingestion rule may specify that a particular data stream be associated with the sensor identifier that identifies the sensor from which the particular data stream is received. Another ingestion rule may specify that a particular data stream be enriched with additional data. For example, a data stream may provide, in each data element of the data stream, a particular value for a measurement and a time at which the measurement was made. An ingestion rule may specify that each data element of the data stream be enriched with a location at which the measurement was made, e.g., obtained from a GPS device.

Some example ingestion rules can help the ingestion engine 130 parse the incoming data stream(s). For example, the data stream received from a particular sensor or a particular type of sensor may arrive at the ingestion engine 130 in a particular format. In a particular example, the data stream may include, for each low-level event, several numbers in a particular order. An ingestion rule may specify the type of data for each ordinal position. For example, the ingestion rule may specify that the first number is a sensor identifier, the second number is a valve identifier, the third number is a timestamp for when the data was generated, the fourth number is a pressure value of the valve, and the fifth number is a temperature at the valve. In this example, the ingestion engine 130 can use the ingestion rule to parse the data stream and associate each number with its respective data type.

The stream map compiler 115 can generate the ingestion rules for the ingestion engine 130 based on the stream mapping 107. For example, the stream map compiler 115 can generate, for each element of the stream model 105, a rule that causes the ingestion engine 130 to associate the type of data defined by the element with the data stream (or discrete data elements of the data stream) received from the sensor that provides that type of data. The stream map compiler 115 can also generate a rule that causes the ingestion engine 130 to enrich data elements of a particular data stream with additional data obtained from another data stream or from another data source, e.g., another data source in the data domain.

The ingestion engine 130 receives the data streams from the sensors 121-123 and processes the data based on the ingestion rules. The ingestion engine 130 can format data included in the data streams, enrich the data elements of a particular data stream based on ingestion rules, associate a sensor identifier with data elements of a particular data stream based on ingestion rules, and/or process the data in other appropriate ways based on ingestion rules for the data. The ingestion engine 130 can store the data in a data storage unit 140. For example, the data elements of a particular data stream, or the data stream itself, may be stored in the data storage unit 140 with data associating the data elements with the sensor identifier for the sensor from which the particular data stream is received and/or with other enriched data added to the data elements.

In some implementations, the ingestion engine 130 generates a single data stream having events received from all of the sensors 121-123. For example, the ingestion engine may generate a data element in the single data stream for each (or at least a portion of) data elements received in a data streams from the sensors 121-123. The ingestion engine 130 may also include in the data elements of the single data stream data specifying the sensor identifier for the sensor from which the data element was received.

The stream processing system 110 also includes a pattern compiler 170 and an event processor 150. The pattern compiler 170 generates stream processor rules based on the stream mapping 107 and stream matching patterns of a pattern library 160. The stream matching patterns can be used to detect high-level events based on low-level events defined in the data streams received from the sensors 121-123. In general, a stream matching pattern includes a pattern of lower level events that together define a high-level event.

In some implementations, a stream matching pattern for a particular high-level event specifies sensor identifiers for data streams from which low-level events of the high-level event may be found. For example, a high-level event may be a "braking in slippery conditions event." This example event may be detected based on a pattern of a vehicle's brakes being applied, the vehicle's wheel rotation slowing down or stopping, while the vehicle's speed does not decrease at least a threshold amount. A stream matching pattern for this event may specify a sensor identifier for the vehicle's brake position sensor, a sensor identifier for a sensor that measures the vehicle's wheel(s) rotational speed, and a sensor identifier for the vehicle's speedometer.

A stream matching pattern for a high-level event can also specify co-occurrence criteria that, if satisfied, indicates that the high-level event has occurred. The co-occurrence criteria can include constituent events that must co-occur within a particular time window in order to conclude that the high-level event occurred. For example, the stream matching pattern for the example braking in slippery conditions event may specify, as constituent events, brakes applied, wheel rotation decreased, and vehicle speed did not decrease.

The stream matching pattern may specify a time window in which each constituent event must occur. The time window for the example braking in slippery conditions event may be five seconds. If each constituent event occurs within a five second period, the conditions of the braking in slippery conditions event may be satisfied. If only two of the three constituent events occur within five seconds and the third constituent event does not occur until six or more seconds after the first constituent event occurred, the criteria of the braking in slippery conditions event may not be satisfied.

The stream matching pattern may also specify a tuple of data elements of the stream model for each sensor identifier to use in identifying the occurrence of each constituent event. Each tuple may be a specified number (e.g., one or more) of sequential data elements of a data stream that can be evaluated to detect the occurrence of the constituent event. Continuing the previous braking in slippery conditions event example, the stream matching pattern may specify a tuple of brake position values for determining whether the brakes are being applied or being applied more heavily than before. The stream matching pattern may also specify a tuple of speed values for determining whether the vehicle's speed decreased. Similarly, the stream matching pattern may also specify a tuple of wheel rotational speed values for determining whether the rotational speed of the wheels decreased.

The stream matching pattern may also specify a threshold for constituent events. For example, the stream matching pattern may specify that the brakes are being applied if the brake position value meets a specified threshold in at least a particular number of sequential data elements in the tuple, or for at least a threshold amount of time. In another example, the stream matching pattern may specify that the brakes are being applied more heavily than before if the brake position value changes at least a threshold amount. In yet another example, the stream matching pattern may specify that the vehicle speed did not decrease if the vehicle speed did not decrease at least a threshold amount.

The stream matching pattern can also specify a minimum or maximum amount of time that an event or measurement meet a threshold for constituent events. For example, the stream matching pattern may specify that the brake position meet a threshold position for at least three seconds to determine that the brakes applied constituent event occurred.

In some implementations, a stream matching pattern may not specify constituent events themselves. Instead, the stream matching pattern may specify that a high-level event occurs when individual patterns within multiple data streams co-occur within a particular time window. For example, a stream matching pattern for the braking in slippery conditions event may specify that the brake position meet a specified position threshold in a time window in which the vehicle speed does not decrease at least a threshold amount.

The stream matching pattern for a high-level event can specify sub-patterns of other high-level events. For example, a high-level event of "vehicle crash due to slippery conditions event" may specify that a "braking in slippery conditions event" co-occur within a time window of a "frontal impact" or "side impact" event.

The pattern compiler 170 generates stream processor rules based on the stream matching patterns and the stream mapping 107. A stream processor rule can specify a high-level event, the conditions of the high-level event (e.g., co-occurrence criteria), and the sensor identifiers for the data streams from which data is used to detect the high-level events. The rule may also specify how to determine a probability that a detected high-level event actually occurred. For example, the probability may be higher if two or more constituent events occurred at the same time or in a short amount of time than if the two or more events occurred within a greater amount of time but within the time window.

The pattern compiler 170 may also generate a plurality of transformations of a stream processing platform. For example, the pattern compiler 170 may include series of modules that each transform or combine streams of data in particular ways in real-time.

The event processor 150 processes the data output by the ingestion engine using the stream processor rules to generate one or more output data streams. Each output data stream includes data elements for detected high-level events. The output data stream may be a chronological sequence of data elements that each describe a high-level event. A data element of the output data stream may include data identifying the high-level event, a probability that the high-level event actually happened, data identifying each detected constituent event, data specifying a time at which the high-level event was detected, data identifying a time at which each constituent event was detected, and/or other appropriate data about the high-level event.

The event processor 150 can evaluate data streams output by the ingestion engine 130 to detect high-level events specified by the stream processor rules. In some implementations, the event processor 150 determines whether two or more events are detected within a time window specified by a stream matching pattern for which a stream processor rule was generated. For example, the event processor 150 can determine whether a first data element specifying a first event was received from a first sensor and a second data element specifying a second event was received from a second sensor within the specified time window. If two or more events were received during the time window, the event processor 150 may then determine whether co-occurrence criteria of a stream matching pattern that include the two or more events are satisfied. If the criteria for a stream matching pattern are satisfied, the event processor 150 generates a data element for the high-level event for which the stream matching pattern was specified and adds the generated data element to the output data stream. The event processor 150 may also determine a probability that the high-level event actually occurred and include the probability in the data element for the high-level event.

In some implementations, the event processor 150 annotates the input streams received from the ingestion engine 130. For example, the event processor 150 may annotate the data streams with data identifying constituent events detected by the event processor 150. This can be useful, for example, if all of the conditions for a high-level event are not satisfied. A user could still review the annotations of the input stream to determine the cause of events.

In some implementations, the event processor 150 generates multiple output streams in parallel. For example, each output data stream may include high-level events that are related to each other. In a particular example, an industrial facility may include several distinct areas. In this example, the data streams for the facility may be transmitted to a common stream processing system 110. The stream processor 150 can then generate a respective output stream for each area in parallel.

Figure 2:
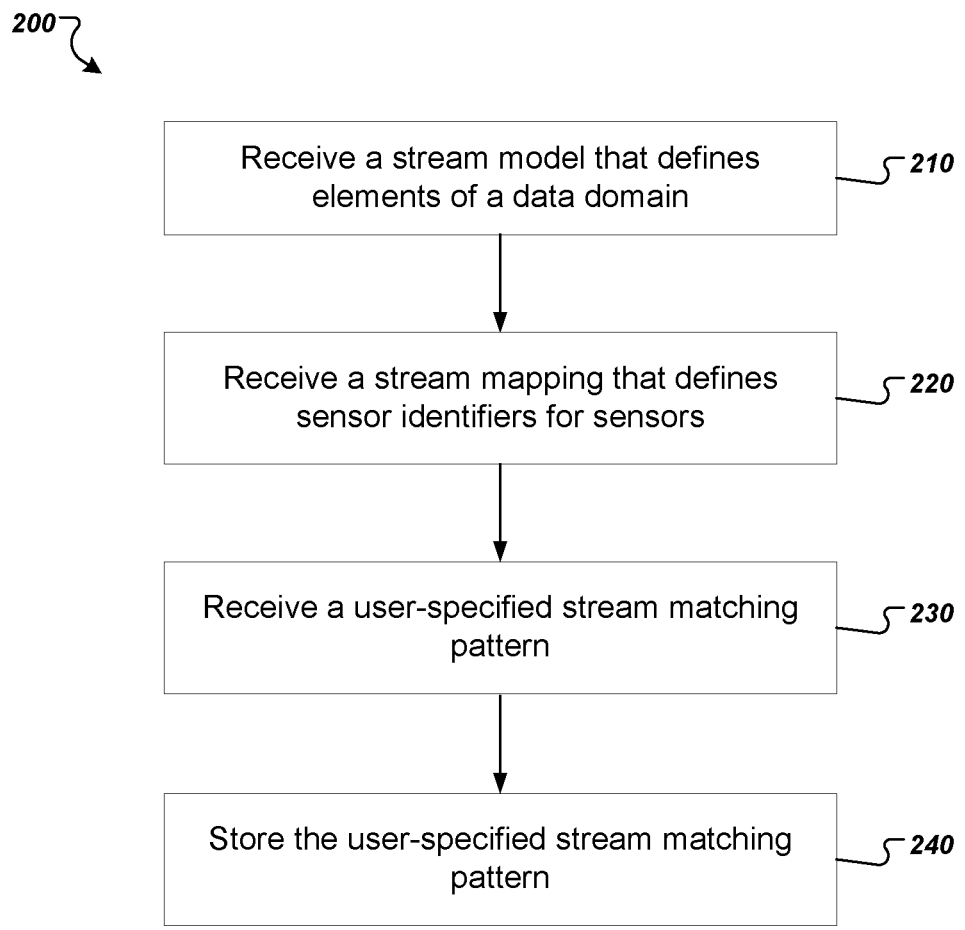
FIG. 2 is a flow chart of an example process for defining a stream-matching pattern.

FIG. 2 is a flow chart of an example process 200 for defining a stream-matching pattern. The process 200 can be implemented by one or more computer programs installed on one or more computers. The process 200 will be described as being performed by an appropriately programmed system of one or more computers, e.g., the stream processing system 110 of FIG. 1.

The system receives a stream model that defines elements of a data domain (210). The data domain can include each type of data available for use in detecting high-level events. For example, a data domain may be a particular vehicle. In this example, the stream model defines each type of data available from sensors installed on or in the vehicle. In another example, the data domain may be an industrial process. In this example, the stream model defines each type of data available from sensors of the process (e.g., pressure sensors, level gauges, etc.).

The system receives a stream mapping (220). For example, a user may define a stream mapping using a user interface provided by a computer. The stream mapping can define a sensor identifier for each sensor that provides data of the data domain. The stream mapping can also associate each sensor identifier with a respective element of the data domain. For example, the stream mapping may associate a level gauge with level values included in a data stream received from a transmitter of the level gauge.

The system receives a user-specified stream matching pattern (230). For example, a user may specify a stream matching pattern using a user interface provided by a computer. The stream matching pattern can be used to detect a high-level event. The stream matching pattern for a particular high-level event can specify sensor identifiers for data streams from which low-level events and/or constituent events based on the low-level events can be found. For example, the high-level event may be determined to have occurred when a measurement from a first sensor meets or exceeds a threshold and when a measurement from a second sensor meets or exceeds a threshold. In this example, the stream matching pattern would specify identifiers for the first and second sensors. For example, the user may specify the sensor identifiers when creating the stream matching pattern.

The stream matching pattern may also specify co-occurrence criteria that, if satisfied, indicates that the high-level event has occurred. As described above, this co-occurrence criteria can include constituent and/or low-level events that occur within a specified time window, tuples of data elements for each sensor identifier, thresholds for constituent events, and/or threshold amounts of times for the duration of the constituent events. The user may specify each of these criteria, for example, using the user interface provided by the computer.

In some implementations, the user interface accepts a limited vocabulary of data for specifying a stream matching pattern for a high-level event. The system can then use the limited vocabulary of data to make more complicated evaluations of input data streams to detect the occurrence of the high-level events. For example, the user interface may allow the user to specify one or more stream names (or sensor identifiers that provide the named data streams), a threshold for each data stream, and a time window for the co-occurrence of events in the data streams. If the events of the specified data streams each meet their respective thresholds within the time window, the system can determine that the high-level event defined by the stream matching pattern has occurred.

The system stores the stream matching pattern (240). For example, the system may store the stream matching pattern in a pattern library. The user can later access the stream matching pattern and/or modify the stream matching pattern. The system can also store the received stream model and the received stream mapping. For example, the system can store the received stream model and the received stream mapping in one or more databases.

After the stream matching pattern is created and stored, a pattern compiler of the system can generate stream processor rules based on the stream matching pattern. In addition, an event processor of the system can use the stream processor rules to detect occurrences of the high-level event that match the pattern in input data streams from the sensors identified by the sensor identifiers of the stream matching pattern.

Figure 3:
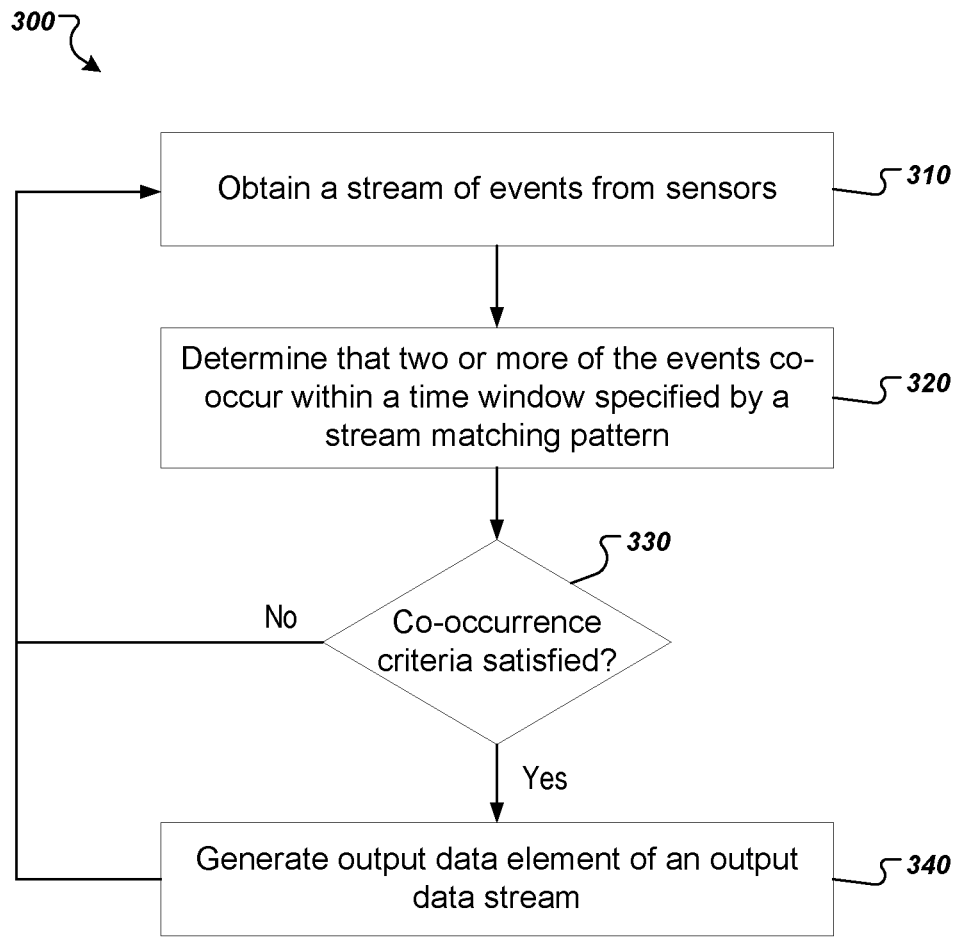
FIG. 3 is a flow chart of an example process for detecting an occurrence of an event using a stream matching pattern.

FIG. 3 is a flow chart of an example process 300 for detecting an occurrence of an event using a stream-matching pattern. The process 300 can be implemented by one or more computer programs installed on one or more computers. The process 300 will be described as being performed by an appropriately programmed system of one or more computers, e.g., the stream processing system 110 of FIG. 1.

The system obtains a stream of events from sensors (310). For example, the system may receive, from each of multiple different real world sensors, a data stream that includes data elements that each specify a low-level event (e.g., a measurement or event). Each data stream can include a sequence of low-level events detected by its respective sensor.

The system determines that two or more events co-occur within a time window specified by a stream matching pattern (320). For example, the stream matching pattern may specify two or more constituent or low-level events that, when they each occur within a time window, indicates that the high-level event has occurred. The time window may be a specified amount of time in which each constituent and/or low-level event has to occur in order to conclude that the high-level event has occurred. Although the stream matching pattern specify two or more specific events that co-occur for the high-level event to be detected, the system may first determine whether any two events co-occur within the time window.

If two or more events of the stream of events co-occur within the time window, the system determines whether co-occurrence criteria of the stream matching pattern are satisfied (330). As described above, the co-occurrence criteria can specify constituent events that must co-occur within a particular time window in order to conclude that the high-level event occurred. The co-occurrence criteria may also specify threshold values for the constituent events and/or threshold amounts of time that the constituent events must satisfy. If the constituent events co-occur within the time window and any thresholds are satisfied, the co-occurrence criteria for the stream matching pattern are satisfied.

If each of the co-occurrence criteria are satisfied, the system generates an output data element of an output data stream (340). For example, the system may generate a data element that specifies the detected high-level event, the time at which the high-level event was detected, a probability that the high-level event actually occurred, and/or other appropriate data related to the high-level event. The system may continue receiving the streams of events, evaluating the events, and generating output data elements for the output data stream when co-occurring events are detected and the co-occurring criteria for the events are satisfied.

If the co-occurrence criteria are not satisfied, the system may not generate an output data element. Instead, the system may continue receiving the streams of events, evaluating the events, and generating output data elements for the output data stream when co-occurring events are detected and the co-occurring criteria for the events are satisfied.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving a stream model that defines a plurality of elements of a data domain;
receiving a stream mapping that defines a sensor identifier for each sensor of a plurality of real-world sensors and associates each sensor identifier with a respective element of the plurality of elements of the data domain, wherein each of the real-world sensors generates a respective stream of real-time data elements received by a stream processing system;
receiving a user-specified stream matching pattern, wherein the stream matching pattern specifies respective sensor identifiers of two or more sensor identifiers of the plurality of real-world sensors, and for each sensor identifier, a tuple of data elements of the stream model and, for each tuple of data elements, one or more co-occurrence criteria, wherein the co-occurrence criteria includes at least one time window;
obtaining a first stream of events from a first subset of the plurality of real-world sensors associated with a first element of the plurality of elements of the data domain;
based on obtaining the first stream of events from the subset of the plurality of real-world sensors, accessing an ingestion rule for the first stream of events;

based on the ingestion rule for the first stream of event, determining to combine the first stream of events with a second stream of events from a second, different subset of the plurality of real-world sensors associated with a second, different element of the plurality of elements of the data domain;

based on determining to combine the first stream of events with the second stream of events from the second, different subset of the plurality of real-world sensors associated with the second, different element of the plurality of elements of the data domain, obtaining the second stream of events from the second, different subset of the plurality of real-world sensors associated with the second, different element of the plurality of elements of the data domain;

determining that two or more events in the first stream of events from the subset of the plurality of real-world sensors associated with the first element of the plurality of elements of the data domain and the second stream of events from the second, different subset of the plurality of real-world sensors associated with the second, different element of the plurality of elements of the data domain co-occur within the time window specified by the stream matching pattern;

determining whether the one or more co-occurrence criteria of the stream matching pattern are satisfied; and whenever the one or more co-occurrence criteria are satisfied, generating an output data element of an output data stream.

2. The method of claim 1, further comprising generating, by a pattern compiler, a plurality of transformations of a stream processing platform.

3. The method of claim 1, wherein the output data element specifies an occurrence of a given event based on the determination that the one or more co-occurrence criteria of the stream matching pattern are satisfied.

4. The method of claim 3, further comprising determining a probability that the given event occurred and including, in the output data element, data specifying the probability.

5. The method of claim 1, wherein determining whether the one or more co-occurrence criteria of the stream matching pattern are satisfied comprises:
   detecting, based on the first stream of events received from the first subset of the plurality of real-world sensors, an occurrence of a first constituent event defined by the user-specified stream matching pattern within the time window;
   detecting, based on the second stream of events received from the second, different subset of the plurality of real-world, an occurrence of a second constituent event defined by the user-specified stream matching pattern within the time window; and
   determining that the one or more co-occurrence criteria of the stream matching pattern are satisfied based at least on the first constituent event and the second constituent event occurring within the time window.

6. The method of claim 5, wherein:
the stream matching pattern specifies a threshold value for the first constituent event; and
the first constituent event is detected in response to detecting one or more events in the first stream of events that satisfies the threshold value.

7. The method of claim 6, wherein:
the stream matching pattern specifies a threshold amount of time for the first constituent event; and
the first constituent event is detected in response to detecting one or more events in the first stream of events that satisfies the threshold value for at least the threshold amount of time.

8. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
   receiving a stream model that defines a plurality of elements of a data domain;
   receiving a stream mapping that defines a sensor identifier for each sensor of a plurality of real-world sensors and associates each sensor identifier with a respective element of the plurality of elements of the data domain, wherein each of the real-world sensors generates a respective stream of real-time data elements received by a stream processing system;
   receiving a user-specified stream matching pattern, wherein the stream matching pattern specifies respective sensor identifiers of two or more sensor identifiers of the plurality of real-world sensors, and for each sensor identifier, a tuple of data elements of the stream model and, for each tuple of data elements, one or more co-occurrence criteria, wherein the co-occurrence criteria includes at least one time window;
   obtaining a first stream of events from a first subset of the plurality of real-world sensors associated with a first element of the plurality of elements of the data domain;
   based on obtaining the first stream of events from the subset of the plurality of real-world sensors, accessing an ingestion rule for the first stream of events;
   based on the ingestion rule for the first stream of event, determining to combine the first stream of events with a second stream of events from a second, different subset of the plurality of real-world sensors associated with a second, different element of the plurality of elements of the data domain;
   based on determining to combine the first stream of events with the second stream of events from the second, different subset of the plurality of real-world sensors associated with the second, different element of the plurality of elements of the data domain, obtaining the second stream of events from the second, different subset of the plurality of real-world sensors associated with the second, different element of the plurality of elements of the data domain;
   determining that two or more events in the first stream of events from the subset of the plurality of real-world sensors associated with the first element of the plurality of elements of the data domain and the second stream of events from the second, different subset of the plurality of real-world sensors associated with the second, different element of the plurality of elements of the data domain co-occur within the time window specified by the stream matching pattern;
   determining whether the one or more co-occurrence criteria of the stream matching pattern are satisfied; and whenever the one or more co-occurrence criteria are satisfied, generating an output data element of an output data stream.

9. The system of claim 8, wherein the operations comprise generating, by a pattern compiler, a plurality of transformations of a stream processing platform.

10. The system of claim 8, wherein the output data element specifies an occurrence of a given event based on the determination that the one or more co-occurrence criteria of the stream matching pattern are satisfied.

11. The system of claim 10, wherein the operations comprise determining a probability that the given event occurred and including, in the output data element, data specifying the probability.

12. The system of claim 8, wherein determining whether the one or more co-occurrence criteria of the stream matching pattern are satisfied comprises:
    detecting, based on the first stream of events received from the first subset of the plurality of real-world sensors, an occurrence of a first constituent event defined by the user-specified stream matching pattern within the time window;
    detecting, based on the second stream of events received from the second, different subset of the plurality of real-world, an occurrence of a second constituent event defined by the user-specified stream matching pattern within the time window; and
    determining that the one or more co-occurrence criteria of the stream matching pattern are satisfied based at least on the first constituent event and the second constituent event occurring within the time window.

13. The system of claim 12, wherein:
    the stream matching pattern specifies a threshold value for the first constituent event; and
    the first constituent event is detected in response to detecting one or more events in the first stream of events that satisfies the threshold value.

14. The system of claim 13, wherein:
    the stream matching pattern specifies a threshold amount of time for the first constituent event; and
    the first constituent event is detected in response to detecting one or more events in the first stream of events that satisfies the threshold value for at least the threshold amount of time.

15. A computer program product, encoded on one or more non-transitory computer storage media, comprising instructions that when executed by one or more computers cause the one or more computers to perform operations comprising:
    receiving a stream model that defines a plurality of elements of a data domain;
    receiving a stream mapping that defines a sensor identifier for each sensor of a plurality of real-world sensors and associates each sensor identifier with a respective element of the plurality of elements of the data domain, wherein each of the real-world sensors generates a respective stream of real-time data elements received by a stream processing system;
    receiving a user-specified stream matching pattern, wherein the stream matching pattern specifies respective sensor identifiers of two or more sensor identifiers of the plurality of real-world sensors, and for each sensor identifier, a tuple of data elements of the stream model and, for each tuple of data elements, one or more co-occurrence criteria, wherein the co-occurrence criteria includes at least one time window;
    obtaining a first stream of events from a first subset of the plurality of real-world sensors associated with a first element of the plurality of elements of the data domain;
    based on obtaining the first stream of events from the subset of the plurality of real-world sensors, accessing an ingestion rule for the first stream of events;
    based on the ingestion rule for the first stream of event, determining to combine the first stream of events with a second stream of events from a second, different subset of the plurality of real-world sensors associated with a second, different element of the plurality of elements of the data domain;
    based on determining to combine the first stream of events with the second stream of events from the second, different subset of the plurality of real-world sensors associated with the second, different element of the plurality of elements of the data domain, obtaining the second stream of events from the second, different subset of the plurality of real-world sensors associated with the second, different element of the plurality of elements of the data domain;
    determining that two or more events in the first stream of events from the subset of the plurality of real-world sensors associated with the first element of the plurality of elements of the data domain and the second stream of events from the second, different subset of the plurality of real-world sensors associated with the second, different element of the plurality of elements of the data domain co-occur within the time window specified by the stream matching pattern;
    determining whether the one or more co-occurrence criteria of the stream matching pattern are satisfied; and
    whenever the one or more co-occurrence criteria are satisfied, generating an output data element of an output data stream.

16. The computer program product of claim 15, wherein the operations comprise generating, by a pattern compiler, a plurality of transformations of a stream processing platform.

17. The computer program product of claim 15, wherein the output data element specifies an occurrence of a given event based on the determination that the one or more co-occurrence criteria of the stream matching pattern are satisfied.

18. The computer program product of claim 17, wherein the operations comprise determining a probability that the given event occurred and including, in the output data element, data specifying the probability.

19. The computer program product of claim 15, wherein determining whether the one or more co-occurrence criteria of the stream matching pattern are satisfied comprises:
    detecting, based on the first stream of events received from the first subset of the plurality of real-world sensors, an occurrence of a first constituent event defined by the user-specified stream matching pattern within the time window;
    detecting, based on the second stream of events received from the second, different subset of the plurality of real-world, an occurrence of a second constituent event defined by the user-specified stream matching pattern within the time window; and
    determining that the one or more co-occurrence criteria of the stream matching pattern are satisfied based at least on the first constituent event and the second constituent event occurring within the time window.

20. The computer program product of claim 19, wherein:
    the stream matching pattern specifies a threshold value for the first constituent event; and the first constituent event is detected in response to detecting one or more events in the first stream of events that satisfies the threshold value.

* * * * *